United States Patent [19]

Maroschak et al.

[11] Patent Number: 4,681,684

[45] Date of Patent: Jul. 21, 1987

[54] UNIVERSAL SEPTIC TANK FITTING

[75] Inventors: Michael D. Maroschak, Casselberry; Frederick P. Atchley, Tallahassee; Douglas G. Everson, Winter Springs, all of Fla.

[73] Assignee: Plastic Tubing Industries, Inc., Orlando, Fla.

[21] Appl. No.: 728,362

[22] Filed: Apr. 29, 1985

[51] Int. Cl.⁴ .............................................. B01D 21/24
[52] U.S. Cl. ..................................... 210/532.2; 285/3; 285/93; 285/153; 285/156; 285/423
[58] Field of Search ...................... 210/532.2, 800, 801, 210/85, 513, 532.1; 285/3, 93, 153, 154, 156, 423, 924

[56] References Cited

U.S. PATENT DOCUMENTS

| | | | |
|---|---|---|---|
| 2,086,154 | 7/1937 | Boggs | 210/532.2 |
| 3,709,527 | 1/1973 | Nations | 285/156 X |
| 3,826,376 | 7/1974 | Carlson et al. | 210/532.2 X |
| 3,904,228 | 9/1975 | Maroschak | 285/156 |
| 3,986,963 | 10/1976 | Maroschak | 210/532.2 |
| 4,363,732 | 12/1986 | Crates et al. | 210/532.2 |

Primary Examiner—Tom Wyse
Attorney, Agent, or Firm—Duckworth, Allen, Dyer

[57] ABSTRACT

A universal septic tank fitting useful as either an inlet sweep or an outlet tee includes a generally tubular member having first and second open ends with a portion of the tubular member adjacent the first end forming an angular bend so that the first end extends generally normal to the member. A tube adjacent the second end extends from the tubular member and in a direction generally opposite to the direction of the first end. A vent is provided along the outer periphery of the angular bend, and a removable closure over the vent is provided. In use, the first end is installed in the inlet wall of a septic tank elevated above the second end, and the closure is removed from over the vent. The same fitting may be used as an outlet tee by installing the extremity of the tube through the outlet wall of the septic tank, elevated with respect to the first end.

14 Claims, 4 Drawing Figures

U.S. Patent   Jul. 21, 1987   Sheet 1 of 2   4,681,684
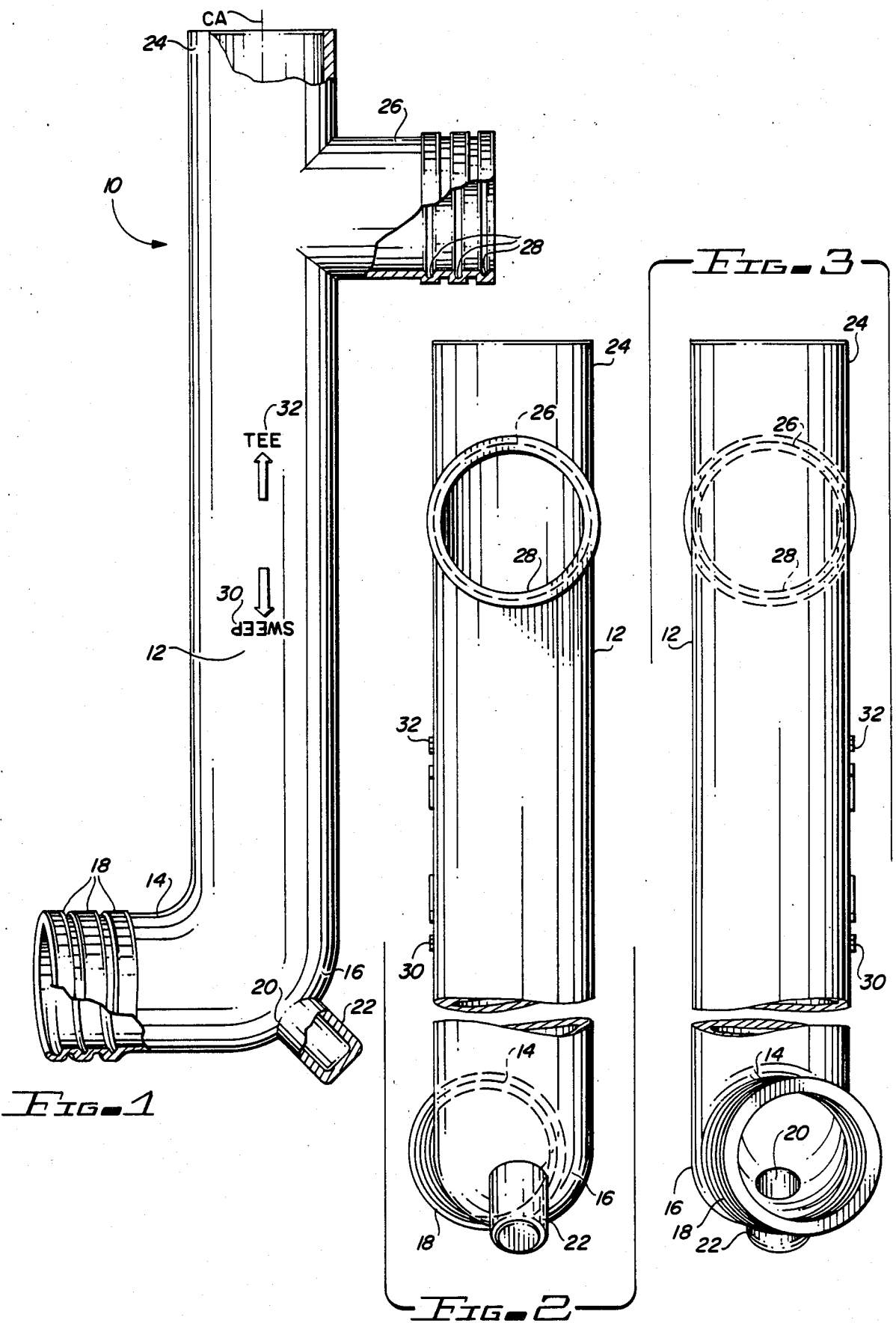

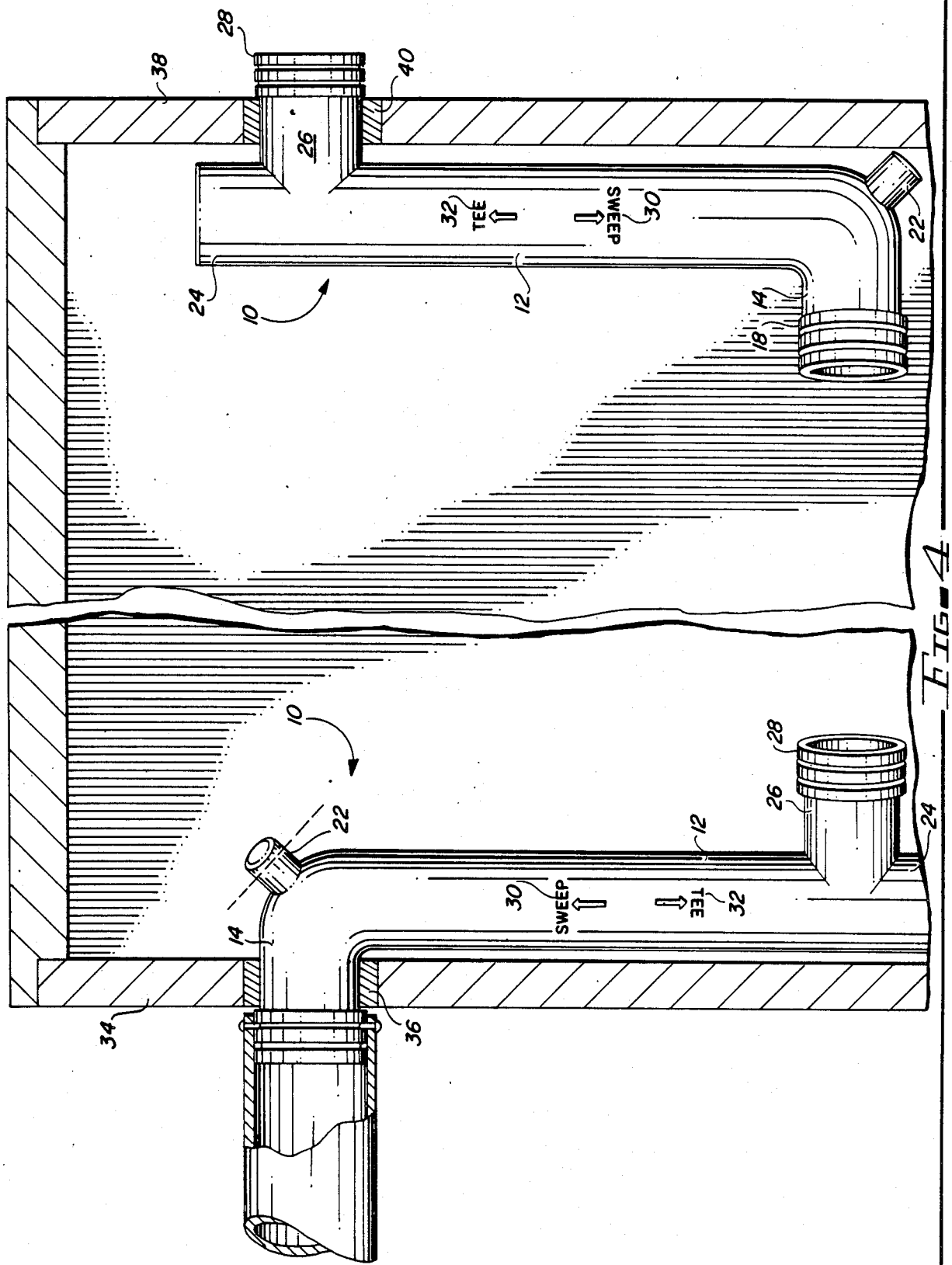

UNIVERSAL SEPTIC TANK FITTING

BACKGROUND OF THE INVENTION

1. Field of the Invention

The present invention relates generally to septic tanks, and more particularly to fittings useful as a septic tank inlet "sweep" or a septic tank outlet "tee."

2. Description of the Prior Art

The term "inlet sweep" refers to the fitting in the inlet wall of a septic tank which communicates at the upper extremity with the discharge line from a building in order to receive effluent and direct the effluent into the septic tank. The term "outlet tee" refers to the fitting which extends through the outlet wall of the septic tank, and is used to direct the liquid discharge of the septic tank to a distribution box across the drain field.

Septic tank sweeps and tees were in the past generally fabricated from clay or terra cotta. Sweeps and tees of these materials usually are installed in position in the respective inlet our outlet wall of the septic tank by passing the neck portion through a preformed hole in the respective wall, and then grouting the remaining space between the hole and the protruding neck portion with cement.

In recent years, pipelines used in septic tank installations have been made of plastic. As a result, an increasing number of inlet sweeps and outlet tees are also being fabricated of plastic. See, for example, U.S. Pat. No. 3,986,963 to Maroschak.

There is a need in the septic tank industry for a universal fitting that may be utilized both as in inlet sweep or alternatively as an outlet tee, which is both fabricated from plastic and made in a relatively inexpensive manner and which may be readily joined to existing plastic pipe in a facile manner, but which also be fitted in a conventional septic tank or tanks in series in the manner described above.

Other prior art of interest include U.S. Pat. Nos. 1,641,469 to Baker; 1,660,697 to Webb; 1,677,626 to Frappy; 2,086,154 to Boggs; and 3,826,376 to Carlson et al.

SUMMARY OF THE INVENTION

The present invention is directed to a universal septic tank fitting useful as either an inlet sweep or an outlet tee.

The universal septic tank fitting of the present invention includes a generally tubular member having a central axis, with a first tube extending into the tubular member adjacent one end thereof and generally radial to the central axis. The first tube has an open end.

A second tube is also provided and extends into the tubular member adjacent the second end and generally radial to the central axis, but in a radial direction generally opposite from the radial direction of the first tube, the second tube also having an open end.

The fitting includes a first vent means adjacent the first end of the tubular member, and a second vent means adjacent the second end of the tubular member.

In a preferred embodiment, the fitting is further provided with plural mating ribs extending about the outer periphery of the extremity of each of the first and second tubes; the ribs are dimensioned so as to receive either a pipe or pipe adaptor in a facile manner. It is also preferred that the tubular member, the first and second tubes and the mating ribs comprise a unitary body of molded plastic.

The vent closing means suitably comprises a unitary molded cap over the first vent means, the cap being frangible to expose the first vent means when the first tube is used as an inlet sweep, but the cap having sufficient structural strength and rigidity to remain as a covering of over said first vent means when said second tube is used as an outlet tee.

In order to identify which of the first and second tubes is to be used as either an inlet sweep or an outlet tee, indicating means are provided along the outer periphery of the tubular member for indicating that, for example, the first end is to be used as an outlet sweep and the second end is to be used as an outlet tee.

Further in accordance with the preferred embodiment, the first tube may comprise a portion of the tubular member forming an angular bend such that the first end extends generally normal from the remaining portion of the tubular member. In this specific construction, the first vent comprises a hole along the outer periphery of the angular bend, with the vent closure comprising a frangible portion of the tubular member molded over that first vent opening.

The present invention also contemplates a method for manufacturing universal fittings useful as both an inlet sweep and an outlet tee and for installing the fittings with a septic tank. This method includes the molding of at least two plastic tubular members, each tubular member having the first and second opening ends described above, with one end extending generally normal to the remaining portion of the tubular member and a tube adjacent the second end extending in a radial direction opposite to the first end.

During installation, the first end of a first one of the two plastic members is extended through a designated end wall of a septic tank with the first end elevated with respect to the second end. At least a portion of the frangible cover over the first vent is removed to expose that vent.

Thereafter, the second end of a second one of the plastic tubular members is extended through a designated outlet wall of a septic tank with the second end elevated with respect to the first end. In the case of the outlet tee, the cover over the first vent may be left in place.

BRIEF DESCRIPTION OF THE DRAWINGS

FIG. 1 is a side view, partially in cross-section, of a universal inlet sweep/outlet tee fitting for septic tanks in accordance with the present invention.

FIGS. 2 and 3 are a front and rear elevation, respectively, of the fitting of FIG. 1.

FIG. 4 is a cross-sectional elevation of a septic tank construction utilizing two universal fittings in accordance with the present invention, with a portion of the septic tank cut away.

DESCRIPTION OF THE PREFERRED EMBODIMENT

A preferred embodiment of the universal septic tank inlet sweep and outlet tee fitting in accordance with the present inveniton will now be described with reference to FIG. 1.

The universal fitting, referred to generally by the reference numeral 10, includes a generally tubular member 12 having first and second open ends 14 and 24, respectively. The major portion of the tubular member 12 defines an imaginary central axis referred to by the letters "CA" in FIG. 1.

The first end 14 defines a first tube which extends generally radially from the central axis CA; in this preferred embodiment, the first end 14 forming the radially extending tube is defined by a portion of the tubular member forming an angular bend 16 in such that the first end 14 extends generally normal to the remaining, major portion of the tubular member 12 and radially from the central axis CA.

The universal fitting 10 further includes a first vent hole 20 extending through the outer periphery of the tubular member 12 at the outside portion of the bend 16. The first vent hole 20 is covered by a frangible closure 22 in the form of a molded cap overlying the vent hole 20.

The fitting further includes plural mating ribs 18 extending about the outer periphery of the extremity of the first end 14.

Reference is now made to the second end 24 of the tubular 12. As is shown, a second tube 26 extends generally radially from the tubular member 12 adjacent the second end 24, but in a direction generally opposite from the radial direction of the second end 14. The second tube 26 likewise includes plural mating ribs 28 about the outer periphery at the extremity of the second tube. In the preferred embodiment, the tube 26 is offset about 4°-5° from the perpendicular in order to account for differences in the shape or dimensions of the inlet and outlet walls of various septic tank configurations.

As discussed above, the universal fitting 20 is also provided with indicating means along the outer periphery of the tubular member 12 for indicating that the first end 14 is intended for use as an inlet sweep and that the second end 24 with the second tube 26 is intended for use as an outlet tee. In the preferred embodiment, the indicating means may include the word "sweep" together with an arrow pointing toward the first end 14, as is shown at element 30 in FIG. 1. Likewise, the word "tee" together with an arrow pointing toward the second end 24, as is shown by element 32 in FIG. 1, may be used to indicate that the second tube 26 is adapted for use as the outlet tee.

The preferred embodiment of the universal fitting 10 of the present invention may be formed from the unitary body of molded plastic, in which the tubular member 12, the first and second ends 14 and 24, the second tube 26, the vent hole 20, the vent closure 22 and the indicating elements 30 and 32, as well as the mating ribs 18 and 28 are all simultaneously fabricated in a single molding operation.

The method of manufacturing multiple fittings for use as both an inlet sweep and outlet tee, as well as the method of installation in a septic tank, will now be described with reference to FIG. 4.

Initially, at least two plastic fittings 10 as shown in FIGS. 1-3 are fabricated.

Thereafter, the first end 14 of a first one of the two plastic universal fittings 10 is extended through a designated inlet wall 34 of a septic tank with the first end 14 elevated with respect to the second end 24. Then, at least a portion of the frangible cover 22 is removed to expose the vent 20.

As is shown on the right hand side of FIG. 4, a second end 24 of a second one of the two plastic universal fittings 10 is positioned such that the second tube 26 extends through a hole in a designated outlet wall of a septic tank with the second end 24 elevated with respect to the first end 14.

Grout or other suitable adhesive 36 and 40 is then packed about the respective first end 14 for the inlet sweep and the second tube 26 for the outlet tee to hold the respective universal fittings 10 in place. It will be appreciated by those skilled in the art that the mating ribs 18 and 28 preclude the sliding of the first end 14 (inlet sweep) or the second tube 26 (outlet tee) from sliding through the grouted hole in the respective inlet wall 34 or outlet wall 38.

As is shown on the left hand side of FIG. 4, a pipe adaptor 42 may be joined to the mating ribs 18 via appropriate fasteners 44.

It will be appreciated by those skilled in the art that the ruptured closure 22 over the first vent hole 20 permits appropriate venting when the universal fitting 10 is used as an inlet sweep. However, when the universal fitting 10 is used as an outlet tee, the open end 24 serves as an appropriate vent.

I claim:

1. A universal septic tank fitting useful as either an inlet sweep or an outlet tee, said fitting comprising:
   a generally tubular member having a central axis;
   a first tube extending into said tubular member adjacent a first end thereof generally radial to said central axis, said first tube having an open end;
   a second tube extending into said tubular member adjacent a second end thereof and generally radial to said central axis, but in a radial direction generally different from the radial direction of said first tube, said second tube having an open end;
   first vent means adjacent said first end of said tubular member;
   second vent means adjacent said second end of said tubular member; and
   means for closing one of said first and second vent means.

2. The universal fitting recited in claim 1 further comprising plural mating ribs extending about the outer periphery of the extremity of each of said first and second tubes.

3. The universal fitting recited in claim 2 wherein said tubular member, said first and second tubes and said mating ribs comprise a unitary body of molded plastic.

4. The universal fitting recited in claim 2 wherein said ribs are dimensioned to receive a pipe adaptor.

5. A universal fitting as recited in claim 1 further comprising an indicating means along the outer periphery of said tubular member for indicating that said first end is an inlet sweep and said second end is an outlet tee.

6. The universal fitting recited in claim 5 wherein said vent closing means comprises a molded cap over said first vent means, said cap being frangible to expose said first vent means when said first end is used as an inlet sweep, but said cap having sufficient structural strength to remain covering said first vent means when said second end is used as an outlet tee.

7. A universal septic tank fitting useful as either an inlet sweep or an outlet tee, said fitting comprising:
   a generally tubular member having first and second open ends;
   a portion of said tubular member adjacent said first end forming an angular bend such that said first end extends generally normal from the remaining portion of said tubular member;
   a tube adjacent said second end of said tubular member extending generally normal from said tubular member and in a direction generally opposite to the direction of said first end;

a vent along the outer periphery of said angular bend;

a removable closure over said vent; and wherein said fitting may be used as an inlet sweep for a septic tank by installating said first end through an inlet wall of a septic tank in an elevated position with respect to said second end and thereafter removing said vent closure; or alternatively, said fitting may be used as an outlet tee by installing said tube through an outlet wall of a septic tank in an elevated position with respect to said first end.

8. The universal fitting recited in claim 7 wherein said vent closure comprises a frangible portion of said tubular member molded over said vent.

9. The universal fitting recited in claim 7 wherein said tubular member and said tube comprise a unitary body of molded plastic.

10. The universal fitting recited in claim 7 further comprising plural mating ribs extending about the outer periphery of the extremity of said first end and said tube.

11. The universal fitting recited in claim 10 further comprising an indicating means along the outer periphery of said tubular member for indicating that said first end is an inlet sweep and said second end is an outlet tee.

12. The universal fitting recited in claim 11 wherein said tubular member, said first and second tubes and said mating ribs comprise a unitary body of molded plastic.

13. The universal fitting recited in claim 12 wherein said ribs are dimensioned to receive a pipe adaptor.

14. A universal septic tank fitting useful as either an inlet sweep or an outlet tee, said fitting comprising;

a generally tubular member having first and second open ends;

a portion of said tubular member adjacent said first end forming an angular bend such that said first end extends generally normal from the remaining portion of said tubular member;

a tube adjacent said second end of said tubular member extending generally normal from said tubular member and in a direction generally opposite to the direction of said first end;

a portion of said generally tubular member adjacent said first end and said angular bend being frangible so as to form a vent therein; and wherein said fitting may be used as an inlet sweep for a septic tank by installing said first end through an inlet wall of a septic tank in an elevated position with respect to said second end and thereafter forming said frangible vent or alternatively, said fitting may be used as an outlet tee by installing said tube through an outlet wall of a septic tank in an elevated position with respect to said first end.

* * * * *